United States Patent Office 3,451,715
Patented June 24, 1969

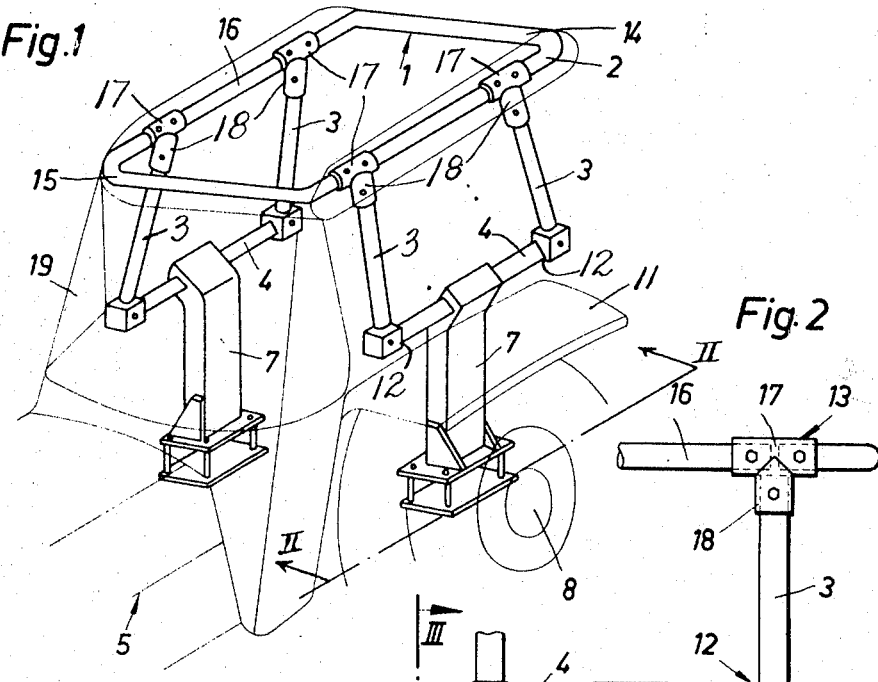
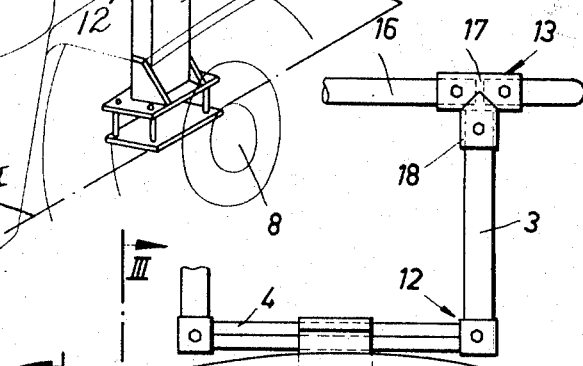
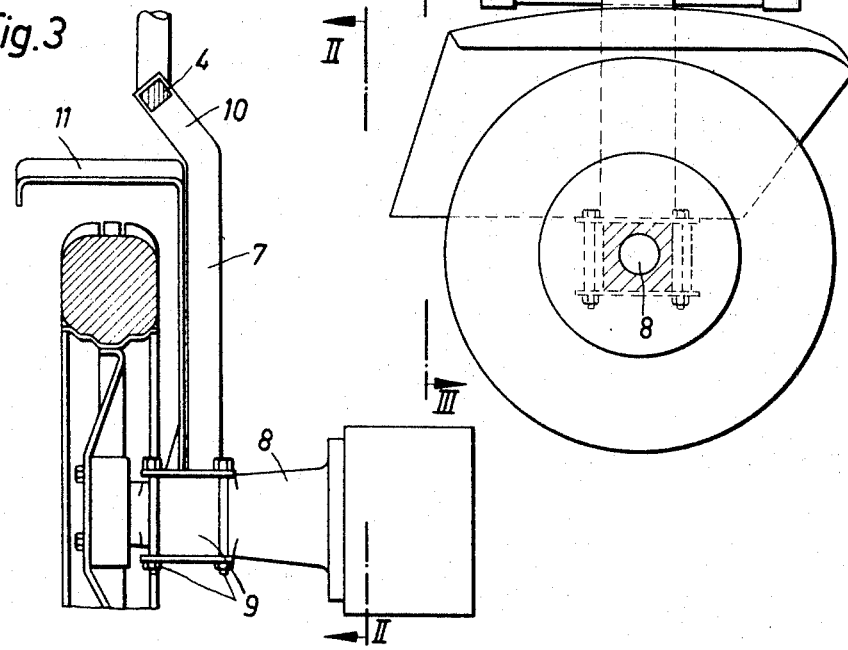

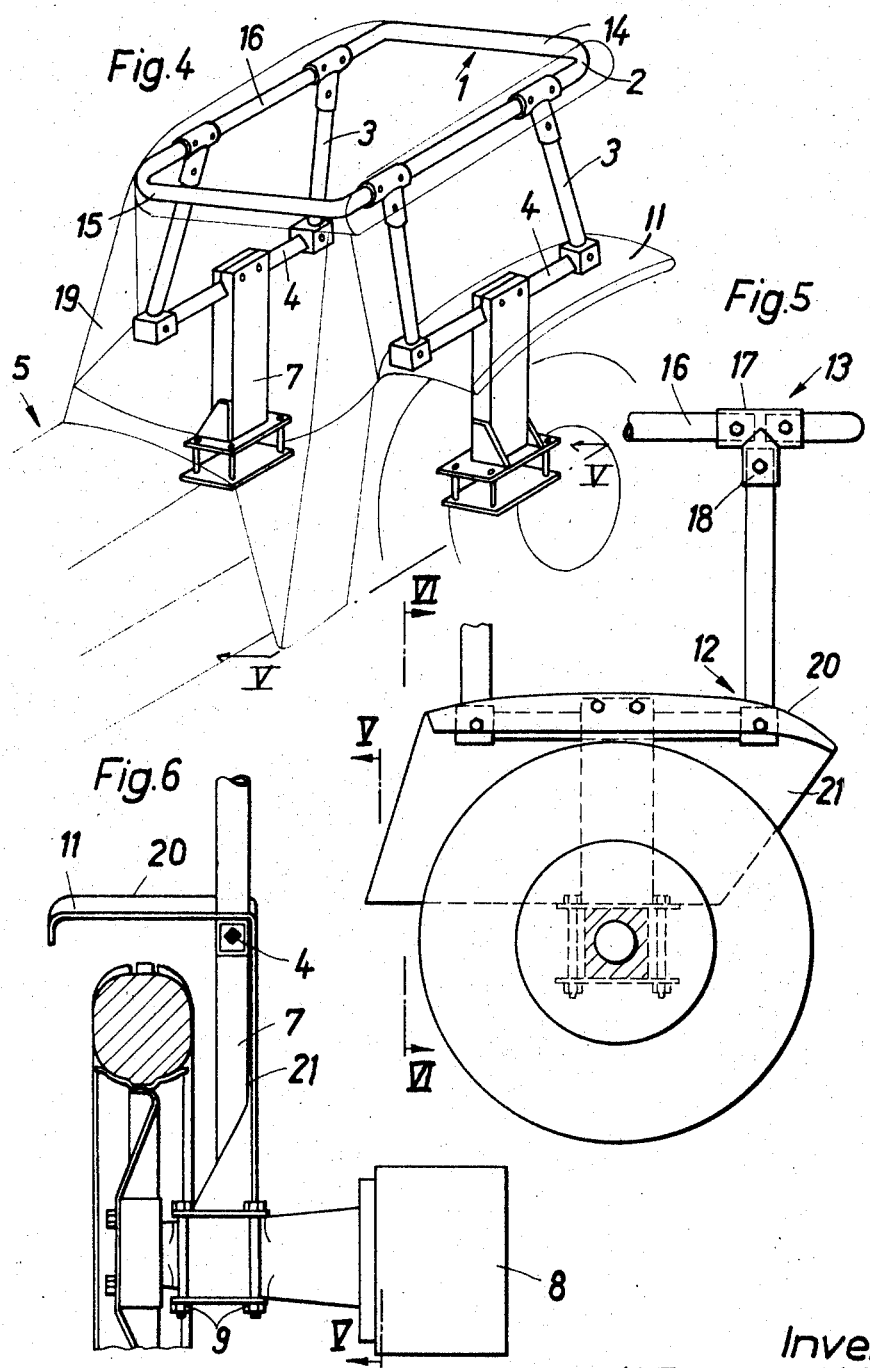

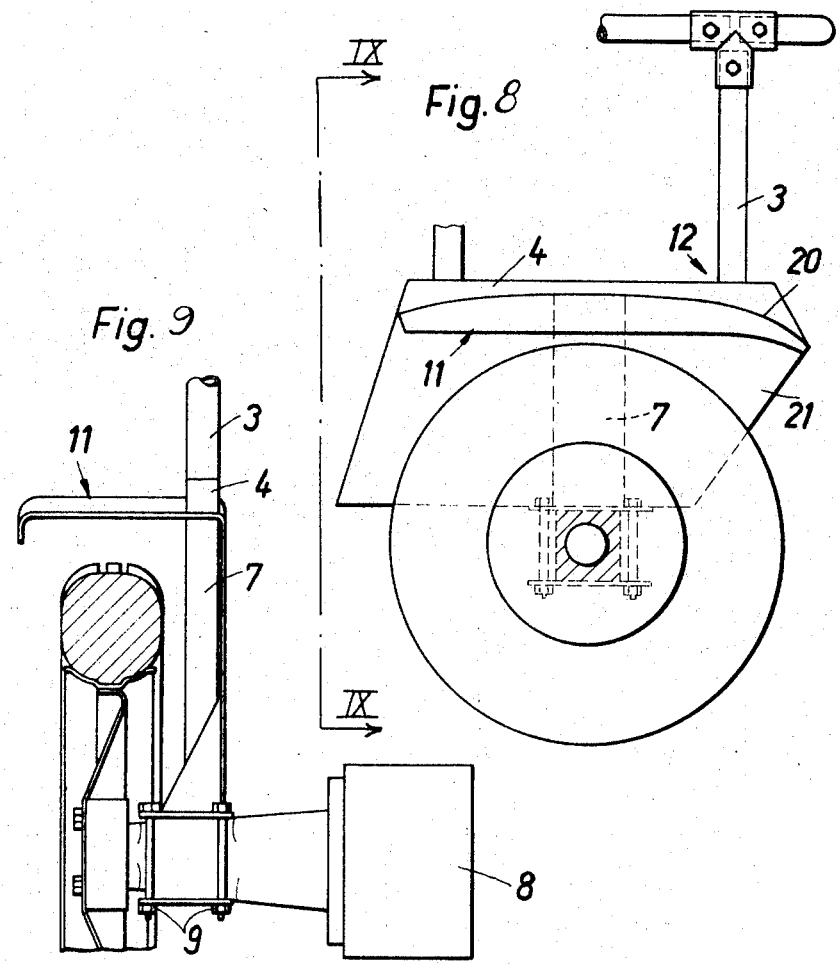

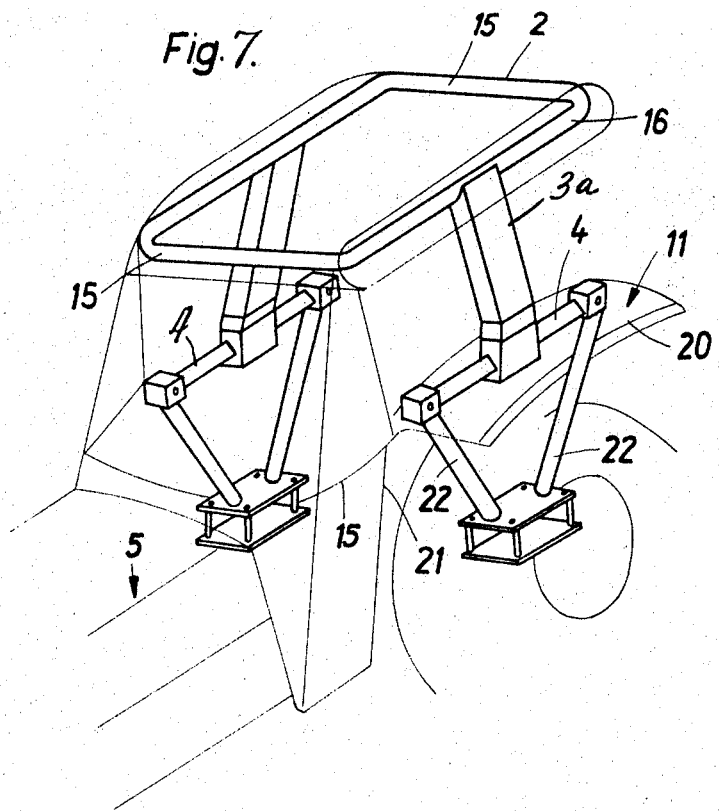

3,451,715
TURNOVER PROTECTION FRAME FOR MOBILE WORKING MACHINES, IN PARTICULAR FOR TRACTORS
Anton Stuckenberger, Bruckmuhl, Germany, assignor to Firma Georg Fritzmeier KG, Munich, Germany
Filed Dec. 13, 1966, Ser. No. 601,369
Claims priority, application Germany, Dec. 17, 1965, F 47,953
Int. Cl. B62d 25/06
U.S. Cl. 296—102                                5 Claims

ABSTRACT OF THE DISCLOSURE

A safety protective frame for machines such as tractors, mounted to support a canopy over the driver's seat, the mounting form being characterized by vertical supports arranged to give a support sufficiently rigid to avoid severe damage yet not so flexible as to induce injury to a driver under the canopy. The structure is characterized by a mounting frame, vertical support carrying the frame over the tractor and a torsion bar which is mounted on the body of the vehicle.

Background of the invention

The invention relates to a turnover protection frame for mobile working machines, in particular for tractors.

A number of turnover protection apparatus have been known which, however, no longer fully meet modern safety regulations because they are either too flexible or too rigid and do not absorb the turnover impact in the most advantageous manner.

Detailed description

It is the object of the invention to provide a turnover protection frame fully complying with the safety requirements.

This object has been attained in that the hood frame bears on the vehicle with its supports by way of horizontally arranged flexible and plastically deformable torsion bars.

With this support any shocks acting on the protective frame when the vehicle rolls over are absorbed by the torsion bars which, depending on the thrust direction, either act in their property as torsion bars or as flexion bars ensuring by plastic deformation the necessary elastic shock absorption on one hand and the necessary dissipation of energy on the other.

A supporting base is expediently rigidly fixed at each side of the driver's seat, said base carrying at its upper end a rigidly clamped torsion bar extending in longitudinal direction of the vehicle, the supports being connected to the free ends of said bar which project over the base at both sides. Thus, an extremely space-saving supporting design is achieved which not only permits the clear application of torsional forces to the torsion bar, but provides the most favorable possibility of absorbing flexional forces as well by means of relatively soft spring action since, in this case, the torsion bars act as a cantilever, clamped beam.

It is of particular advantage if the supports are set off inwardly from the front and rear transverse arms of the rectangularly shaped hood frame, and if they are connected, preferably by hinges, to the longitudinal arms of the hood frame. This causes the hood frame to project at the rear and at the front, and this has the advantage that a wind-screen can conveniently be attached to the hood frame in front without any loss of the operator's space of action, while the hood projection at the rear has the function of preventing further rolling over.

In tractors having the driver's seat somewhat in the area of the rear axle between the bigger rear wheels, the supporting base is advantageously clamped onto the rear axle at both sides of the seat, its upper end bearing the torsion bar being bent outwardly over the mudguards so that the space upwardly enclosed by the protective frame is sufficiently wide.

A still more favorable solution is obtained if each base is mounted on the rear axle between the rear wheel and the side plate of the mudguard at the outer side of the mud-guard, and if the torsion bar is provided below the upper plate of the mudguard, the hood supports passing through holes in the upper plate. Thereby the space between the side plate of the mudguard and the rear wheels is also utilized in a clever way, and the mudguard proper is at the same time also employed for shock absorption via the supports projecting through the upper plate of the mudguard.

A further possibility resides in the fact that the top of the base is flush with the upper plate of the mudguard and is rigidly connected to the torsion bar, the latter resting on the upper plate and being adapted thereto in longitudinal direction, and the hood supports being welded to the torsion bar.

Another solution to the problem resides in the fact that the hood frame is supported centrally on each longitudinal side of the vehicle by means of a support on a torsion bar extending in longitudinal direction of the vehicle, said bar being itself rigidly connected to the rear axle of the vehicle by means of two struts in V arrangement fixed to the ends of the bar.

The invention will be explained in more detail hereinafter with reference to schematic drawings of several embodiments, wherein:

FIG. 1 is a diagrammatic view of a tractor having a turnover protection frame designed in accordance with the invention;

FIG. 2 is a partial side view of the turnover protection frame in accordance with FIG. 1, taken on line II—II of FIG. 1 and FIG. 3;

FIG. 3 is a sectional view taken on line III—III of FIG. 2;

FIG. 4 is a view of another embodiment of the invention similar to that shown in FIG. 1.

FIG. 5 is a sectional view taken on line V—V of FIG. 4 and FIG. 6.

FIG. 6 is a sectional view taken on the line VI—VI of FIG. 5.

FIG. 7 is a diagrammatic view corresponding to FIG. 4 showing another embodiment of the turnover protection frame designed in accordance with the invention.

FIG. 8 is a sectional view taken on line V—V of FIG. 4 showing a modification thereof.

FIG. 9 is a sectional view taken on line VI—VI of FIG. 5 showing a modification thereof.

Identical reference marks for identical parts have been employed in all figures.

The turnover protection frame marked 1 in the FIGURES 1 to 3 consists essentially of a hood frame 2 designated as a simple rectangular frame and bearing on the vehicle 5 by means of four supports 3 via two torsion bars 4.

Each of the two torsion bars 4 mounted at the sides of the driver's seat and extending parallel with the longitudinal axis of the vehicle is fixed to a supporting base 7 which is clamped onto the rear axle 8 of the vehicle at 9 (FIG. 3), its upper end 10 expediently being bent outwardly over the mudguard 11 where it carries the torsion bar 4 in a fixed but releasable manner. The supports 3 of the hood frame 2 are fixed to the free ends 12 of the torsion bars where they are releasably attached by a clamping fit. The supports 3 are connected to the hood frame 2 by means of joints 13, the supports 3 being set off inwardly from the transverse arms 14 and 15 of the hood frame and hinged to the longitudinal arms 16. This purpose is met by a securable sleeve 17 slid onto the longitudinal arms and a bushing 18 arranged at right angles for receiving the upper end of the respective support 3. The hinge connection of the supports 3 has the advantage that all parts of the turnover protection frame can be folded to form a flat package which is indispensable for shipment. The set-off arrangement of the supports from the transverse arms provides a hood frame projecting in front and at the rear and capable of serving as an impediment to further turnover in the rear and as a support for a windscreen 19 in front.

The hood frame and the supports may be formed of steel tubes, whereas a solid or hollow square-sectional bar is especially suitable as the torsion bar.

Contrary to the embodiment according to FIGURES 1 to 3, the supporting base of the embodiment according to FIGURES 4 to 6 is at first mounted on the rear axle of the indicated tractor in such a manner that it is located on the outer side of the mudguard 11 between the side plate 21 of the mudguard and the associated rear wheel. The supporting base terminates somewhat below the upper plate 20 of the mudguard where it carries the torsion bar 4, so that the latter is also located below the upper plate of the mudguard. The supports 3 pass through the upper plate 20 of the mudguard by way of holes (not shown) and are rigidly connected with the ends of the torsion bar below the upper plate of the mudguard. With this embodiment a clearance is obtained between the mudguards of the two rear wheels larger than with the embodiment according to FIGURES 1 to 3, and moreover a more appealing shape is achieved which has the further advantage that a smaller number of parts project in an undesired manner.

The embodiment according to FIGURES 8 and 9 includes a modification of that according to FIGURES 4 to 6 in that the torsion bar in this case rests on the upper plate 20 of the mudguard, is adapted to the latter in longitudinal direction and is welded to the supporting base 7 located on the outer side of the mudguard, an opening (not shown) for said base being provided in the upper plate of the mudguard. In this embodiment the supports 3 are expediently welded to the torsion bar 4.

In FIG. 7 the torsion bar 4 is arranged below the upper plate of the mudguard in accordance with the embodiment shown in FIGURES 4 to 6, in this case, however, the torsion bar being fixed to the rear axle by means of two struts 22 in V arrangement connected to the two torsion bar ends. For supporting the hood frame a single, in this case box-shaped, strut 3a is provided which is connected with the central area of the torsion bar 4 through an opening in the upper side of the mudguard and which is either welded to the hood frame, as shown, or connected to it by means of a socket joint, so that the hood frame can be moved relative to the strut 3a.

In the designs described above, the turnover protection apparatus is substantially supported on the vehicle by flexible and plastically deformable torsion bars, which act either in their property as torsion bars or as normal flexion beams, depending on the direction of the shock impulses. Thus, a sufficiently flexible absorption of shocks from any potential thrust direction, and at the same time a relatively good dissipation of energy by plastic deformation, is achieved.

In addition to the mechanical advantage of extremely simple assembly, the embodiments shown have the advantage of requiring a small number of individual parts, which, moreover, are arranged in such a clever manner that free front and rear entry is possible. The supporting base or the struts may also bear on the rear axle at the outer side of the wheels. In this case, the upper section carrying the torsion bar is bent inwardly over the mudguard.

I claim:

1. A turnover protection frame for a tractor, having a body seat, wheels and front and rear axles, and mudguards over said wheels, comprising in combination a frame for carrying a hood, a supporting base at each side of the tractor rigidly mounted thereon, a torsion bar rigidly connected to said supporting base intermediate the ends thereof and extending the longitudinal direction on each side of the vehicle and projecting over the supporting base, supports carrying said frame, said supports being connected with their upper ends to said frame with their lower ends rigidly clamped to said torsion bar.

2. Turnover protection frame according to claim 1, wherein said frame has front and rear transverse arms, and wherein the supports are set inwardly from the front and rear transverse arms of the hood frame and are pivotally connected to said hood frame, with a pivot axis extending in the longitudinal direction of the vehicle.

3. Turnover protection frame according to claim 2 characterized in that the supporting base is joined onto the rear axle of the tractor between the rear mudguards and the tractor, its end carrying the torsion bar and being extended outwardly over the mudguards.

4. Turnover protection frame according to claim 1 wherein the top of the supporting base is flush with the top of the mudguard and is rigidly connected to the torsion bar, said torsion bar resting on the mudguard, and being in the longitudinal direction of the tractor, and the supports are joined to the torsion bar.

5. A turnover protection frame for a tractor, having a body seat, wheels and front and rear axles, and mudguards over said wheels, comprising in combination, a frame for carrying a hood, a supporting base at each side of the tractor rigidly mounted thereon, a torsion bar rigidly connected to said supporting base and extending in the longitudinal direction on each side of the vehicle, said supporting base being formed by two struts in V-arrangement joined onto the rear axle of the tractor, supports carrying said frame and being connected with their upper ends to said frame and with the lower ends to said torsion bar intermediate the ends thereof.

References Cited

UNITED STATES PATENTS 3,036,858    5/1962    Fingerut _____ 296—102
3,101,215    8/1963    Fritzmeier _____ 296—102

BENJAMIN HERSH, *Primary Examiner.*

ROBERT S. SONG, *Assistant Examiner.*